United States Patent [19]

Neher

[11] 4,157,697
[45] Jun. 12, 1979

[54] WATER COLLECTING DEVICE FOR AN ANIMALS WATERING VALVE

[76] Inventor: Hans Neher, Am Wickengarten 10, 6292 Weilmunster 4, Fed. Rep. of Germany

[21] Appl. No.: 773,746

[22] Filed: Mar. 2, 1977

[30] Foreign Application Priority Data

Mar. 5, 1976 [DE] Fed. Rep. of Germany ....... 2609073

[51] Int. Cl.² .......................................... A01K 39/02
[52] U.S. Cl. ................................................... 119/75
[58] Field of Search ...................... 119/75, 72, 72.5, 18

[56] References Cited
U.S. PATENT DOCUMENTS

| | | | |
|---|---|---|---|
| 2,220,421 | 11/1940 | Munson | 119/75 |
| 3,520,281 | 7/1970 | Hart | 119/75 |
| 3,952,706 | 4/1976 | Hart | 119/75 |

*Primary Examiner*—Hugh R. Chamblee
*Attorney, Agent, or Firm*—Max Fogiel

[57] ABSTRACT

A water collecting arrangement for providing water particularly for small animals such as baby chicks, in which a water collecting bowl with an actuating lever pivotably mounted therein, actuates a watering valve. The watering valve is connected, on one end, to a water pipe, and a free end of the valve is connected to a valve stem for actuating the valve. The stem moves with the actuating lever. An elastic holding clamp which may be attached to the water pipe without the use of tools, holds in place a bottom portion containing the collecting bowl, by means of a bayonet-catch quick-connecting arrangement. The bottom portion is insertable into the holding clamp and can be connected detachably, without tools, by turning through an angle of substantially 90°. The holding clamp has a U-shaped cross-section and a center bar which has a passage in the center for the watering valve. The holding clamp, furthermore, has a smaller clearance width between the free ends of its outer legs. A T-shaped groove or recess is provided in the holding clamp, which is open to the outside and serves as a fastening element for the bottom portion. The T-groove or recess on the center bar is in the zone of the passage and extends lengthwise on the center bar.

20 Claims, 5 Drawing Figures

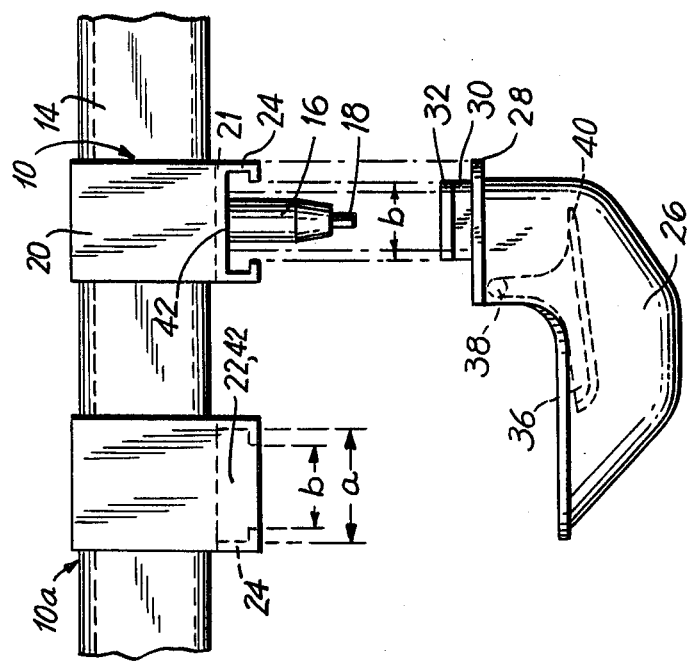
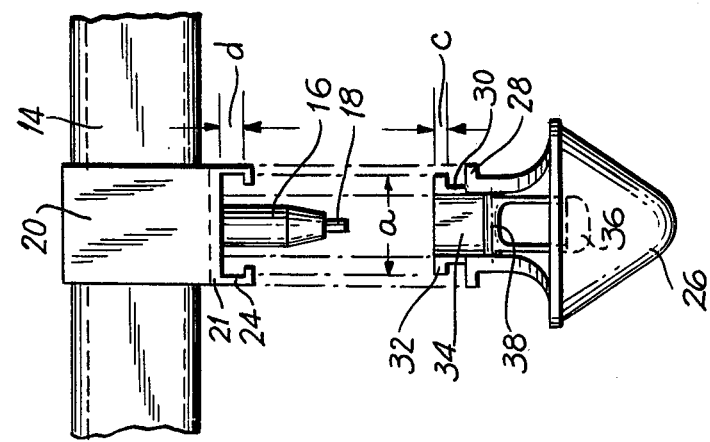

WATER COLLECTING DEVICE FOR AN ANIMALS WATERING VALVE

BACKGROUND OF THE INVENTION

The present invention relates to a water collecting device with a collecting bowl, with means for fastening it, and with an actuating lever, pivotably mounted in the inside of the collecting bowl, for a watering valve, particularly for small animals, such as baby chicks. The watering valve is connected on one end to a water pipe and on its free end has a valve stem for actuating the watering valve; this stem moves when the actuating lever is moved.

With a known conventional watering device for small animals, a watering valve is screwed into the wall of a water line from below and a collecting bowl at its bottom is screw-fastened to the watering valve. The watering valve must be especially adapted to this purpose (by being threaded) and is continually exposed to the danger of being destroyed (wrecked) by the external load of the collecting bowl. When breeding small animals, particularly baby chicks, it has been found that the known watering device is impractical to handle and is difficult to clean because of the relatively unfavorable solubility of the collecting bowls. This and other shortcomings during breeding lead to a large number of premature animal deaths.

It is, therefore, an object of the present invention to provide a water collecting device of the above type which can be used with any not especially adapted watering valve, of any type and dimension, which comprises a few inexpensive and easily handled parts, and which makes possible quick attachment and removal of the collecting bowl for cleaning, without influencing the water valve.

Another object of the present invention is to provide a watering arrangement for small animals, of the foregoing character, which has a substantially long operating life and may be economically maintained in service.

SUMMARY OF THE INVENTION

The objects of the present invention are achieved by providing that it is made in two parts and comprises an elastic holding clamp, which can be attached to the water line without tools, and a bottom part with the collecting bowl and the actuating lever located therein. The holding clamp and the bottom part have slide-catch (bayonet type) quick-connections by means of which the bottom part can be inserted in the holding clamp and can be connected without tools by a 90° rotation. The water collecting device in accordance with the present invention is not connected to the watering valve, but to the water line (pipe) itself. Thus, any watering valves may be used which are protected against the external loads of the water collecting bowl. Because the water collecting device has two parts, and due to the bayonet-like connection, the bottom portion can be easily and quickly cleaned, serviced or replaced by rotating it about 90° and pulling it away from the holding clamp. It can be easily reattached to the holding clamp by insertion and rotation −90°. The holding clamp can be connected with sufficient firmness to the water pipe by simply snapping it on. The water collecting device according to the present invention is very inexpensive, rugged, safe, and easy to handle.

The holding clamp has a U-shaped cross-section and its middle leg has a passage surrounding the watering valve. It is preferable if the holding clamp at its middle leg has a T-groove or recess opening towards the outside, or towards the bottom. This groove serves as a fastening means for the bottom portion. This groove can also simultaneously form the passage if it is, moreover, open towards the inside or towards the top. Also, it can be closed on both face sides.

A very useful embodiment results when the bottom portion as fastening means has a fastening knob with a valve insertion opening which in the assembled condition is in line with the passage for the holding clamp. The fastening knob has at least one stringer at least partially surrounding the valve insertion opening with a holding rim which in one position of the bottom portion—in the lengthwise alignment with the water pipe—can be inserted from below into the T-groove or recess of the holding clamp. By rotating the bottom portion by about 90° into the use (operative) position, the holding rim can be connected to the holding clamp in a bayonet-type fashion. The wider holding rim of the bottom portion is held over the narrower bottom side opening width of the T-groove of recess. The latter may also be a simple rectangular cutout in the middle leg. The length of this cutout is greater than the width, and its width corresponds to the opening width of the T-groove or recess.

In another embodiment, the collecting bowl has an oval cross-section and tapers off downward like a truncated cone. Such a collecting bowl is easy to manufacture and easy to clean. In raising baby chicks, it has been found that it is advisable to make available to the baby chick a clearly visible, though small, water supply, in order to stimulate thirst and avoid numerous deaths occurring otherwise. For this reason it is preferable if the actuating lever is longitudinal and cup-shaped (or spoon-shaped) and is covered with water when depressed; the water remains in the cup-shaped part as small water supply in order to attract the chick. When the beak of the attracted chick touches the actuating lever, further water will flow, via the actuating lever into the collecting bowl. So that the chick can reach the larger water supply available on the bottom of the collecting bowl without having to continuously push down the actuating lever, a sufficient space should be provided between the front edge of the actuating lever and the collecting bowl. When the water supply has been gradually used up, the chick by itself will turn to the clearly visible water supply in the cup-like actuating lever, which is triggered. This prevents a large undrinkable water supply from being present for a long period, which can lead to chicken death. In addition, acidification of the animal feed unavoidably being present in the collecting bowl is avoided, and the chicks are lured to pickup, at least partially, the feed remaining in the collecting bowl. This results in a self-cleaning effect and further assists the simple cleaning processes, which are already simple because of the possibility of removing the bottom portion. The holding clamp and the bottom portion may be made of synthetic material and/or corrosion resistant metal. In any case, the actuating lever should be made of bare high-grade steel, bright, to heighten the optical stimulus to the chicks and encourage drinking.

The novel features which are considered as characteristic for the invention are set forth in particular in the appended claims. The invention itself, however, both in its construction and method of operation, together with additional objects and advantages thereof, will be best understood from the following description of specific embodiments when read in connection with the accompanying drawings.

BRIEF DESCRIPTION OF THE DRAWING

FIG. 2 shows the collecting device of FIG. 1 in an exploded front view, with the bottom portion with the collecting bowl aligned with the holding clamp;

FIG. 3 shows the collecting device of FIGS. 1 and 2 in an exploded front view where the bottom portion with the collecting bowl is turned 90° with respect to the holding clamp and where a modified embodiment is shown on a second holding clamp.

DESCRIPTION OF THE PREFERRED EMBODIMENTS

Figure 1:
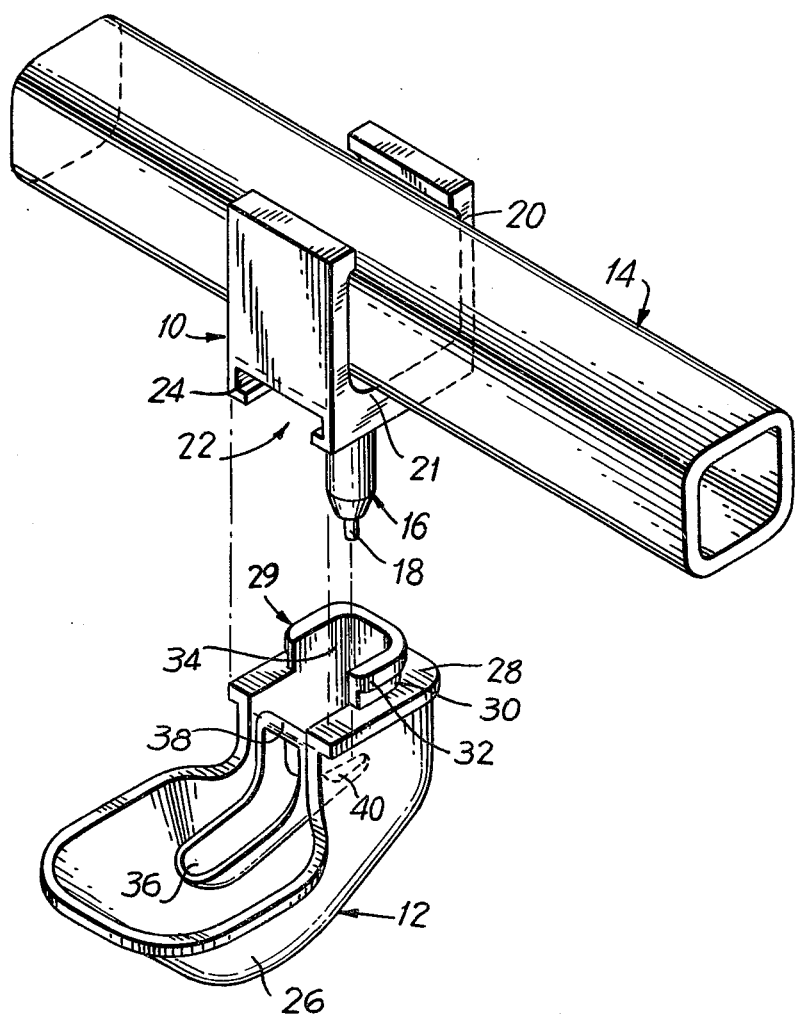
FIG. 1 shows a perspective exploded view of a collecting device in accordance with the present invention, which a holding clamp is seated on a water pipe and a bottom portion with a collecting bowl is shown aligned with it a distance away.

Referring to FIG. 1, the collecting device comprises a holding clamp 10 and a bottom portion 12 connected thereto. The holding clamp 10 is snapped on a pipe line 14 which instead of the square cross-section may have a round or any other cross-section. The pipe line 14 holds a watering valve 16 of any design which does not have to be especially adapted to the collecting device. Thus, for example, this valve may have an unthreaded connection to pipe line 14 and has at its free bottom end, a valve stem 18, which, by being pushed, opens the watering valve 16. The holding clamp has two facing and somewhat elastic outer legs 20 which at their free ends have a smaller width in the clear in order to achieve a better hold on the pipe 14. The two outer legs 20 are connected by a center member 21 which has a passage opening 42 (see FIGS. 3, 4). In the assembled state the watering valve 16 is accommodated freely inside this passage, protected from external stress on the water collecting device.

In the embodiment of the holding clamp 10, the bottom side of the center bar 21 has a continuous (see drawing) or closed (variation, closed on both sides) T-groove or recess 22 open downwards or towards the outside. This groove or recess is bounded on the side by tracks 24. This T-groove or recess 22, furthermore, serves as fastening means for the bottom portion 12 and extends with this embodiment in the longitudinal direction of the center member 21.

The bottom portion 12 has an oval collecting bowl 26 tapering downward in the shape of a truncated cone; it terminates in an upper end plate 28. The latter mounts a fastening head 29 which serves as means for fastening the bottom portion to the holding clamp and is intended for insertion into the T-groove or recess 22. The fastening head 29 has stringer 30 which is open in the forward direction and two facing sections of a laterally overhanging holding rim 32. The T-groove or recess 22 of the holding clamp 10 and the fastening head 29 of the bottom portion 12 are discussed in detail in conjunction with FIGS. 2 and 3.

When mounting the collecting device, the watering valve 16 is slipped through the passage 42 of holding clamp 10 and through the valve insertion opening 34 of the fastening head 29 with its valve stem into the interior of the bottom portion 12. The latter contains a cup-like actuating lever 36 which is tilted forward. This lever has in the bottom portion 12 a pivot support 38 and a rear lever extension 40. The latter is located underneath the valve stem 18 and lifts it when the actuating lever 36 is pressed, thus opening the watering valve 16.

FIG. 2 shows that the laterally overhanging holding rim 32, comprising two facing sections, has a larger cross-sectional dimension a than the opening width b in FIG. 3; a corresponds to the larger width of the T-groove or recess 22. The height c of the holding rim 32 is smaller than the depth d of the wider section of the T-groove or recess 22. In order to make possible a holding insertion of the holding rim 32 in the T-groove or recess, allowing for the previously mounted watering valve 16, the bottom portion 12 is pivoted according to FIG. 3 by 90° from its operating position so that the narrower cross-sectional dimension of holding rim 32, which is similar to that of stringer 30, corresponds to the opening width b of the T-groove or recess 22. The bottom portion 12 can then be inserted with its fastening head 29 from below into the T-groove or recess 22, and is then pivoted back by 90° into the actual operating position where the bottom portion 12 is fixed to the holding clamp 10 by a bayonet-type catch. The stability of this quick-connection which can be accomplished without tools by mutual relative insertion and rotation, is favored by the end plate which in the assembled state is in contact with the bottom of the holding clamp 10 and the tracks 24 and prevents a lateral shifting of the bottom portion.

FIG. 3 shows next to the holding clamp 10 a slightly modified holding clamp 10a. Here the face sides of the T-groove or recess 22 are closed. Also, the T-groove or recess opens towards the inside or towards the top so that it passes directly into the equally large passage 42. Functionally, there is no difference between the holding clamps 10, 10a since also with the holding clamp 10, the insertion of the fastening head 29 is not made from the face sides of the T-groove or recess 22, but from below. Finally, the recess 22 may also be a rectangular cutout in the center member (not shown) with the length of the cutout (in the longitudinal direction of the center member) larger than its width, which corresponds to opening width b.

Figure 4:
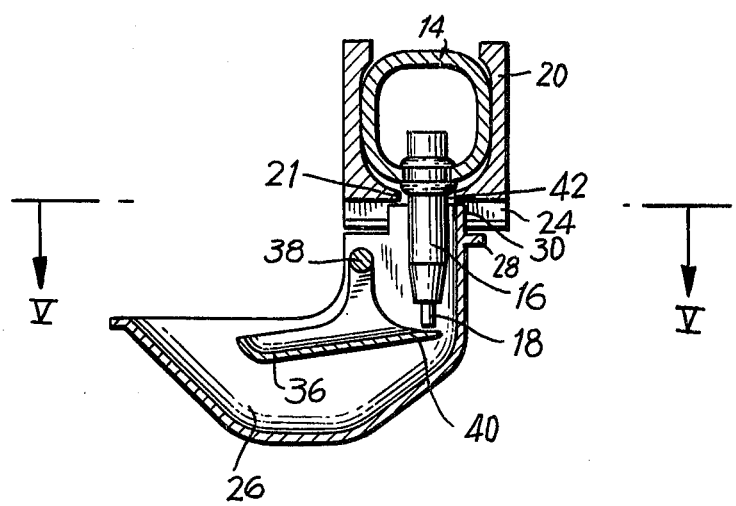
FIG. 4 shows a cross-section taken along line IV—IV in FIG. 5 with a collecting device assembled.
Figure 5:
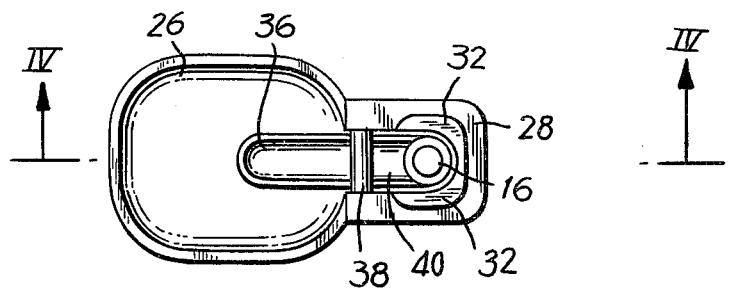
FIG. 5 shows the collecting device view of a section taken along line V—V of FIG. 4.

FIG. 4 shows the assembled collecting device and its connection to the water pipe 14, with the watering valve 16 extending into the inside of bottom portion 12 and contacting the rear of lever extension 40. FIG. 5 shows the facing sections of the laterally projecting holding rim 32 which hold the fastening head 29 in the T-groove or recess 22. (FIG. 5 is a top view of the bottom portion 12).

In the present embodiment, the holding clamp 10 or 10a and the bottom portion 12 with the pivot bearing 38 and the lever extension 40 are made of synthetic material, while the actuating lever 36 is made of harder, bare corrosion-resistant metal, such as high-grade steel, in order to increase the attraction to the chick. If material costs are not important, the collecting bowl 26 and/or the holding clamps 10 or 10a can be made of corrosion resistant material also.

Aside from the embodiment shown, various other embodiments can be used. It is important, however, that the collecting device is not fastened to the watering valve 16, but to the water pipe 14 and comprises two parts, so that the bottom portion 12 with the collecting bowl 26 and the actuating lever 36 can be easily and quickly detached for cleaning, servicing and replacement, without using any tools and without affecting the watering valve. The collecting device in accordance with the present invention thus can be combined with various watering valves and, because of the adjustable design of the holding clamp, can be connected to water pipes of varying cross-sections. If necessary, different holding clamps can be provided for different pipe cross-sections, to assure good support; the bottom portions combined with these holding clamps remain the same.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A water collecting device for a watering valve, particularly for smaller animals, said watering valve having one end connected to a water pipe and having a movable valve stem at another free end, said water collecting device comprising an elastic holding clamp attachable to said water pipe without tools; a bottom portion having a collecting bowl and an actuating lever pivotally mounted in said collecting bowl, said valve stem being movable by said actuating lever; connecting means having bayonet-type catch quick-connecting means both at said bottom portion and at said holding clamp and being adapted for detachably connecting said bottom portion to said holding clamp without tools by firstly inserting part of the quick-connecting means of said bottom portion into top of the quick-connecting means of said holding clamp and by secondly turning said bottom portion substantially 90°.

2. A water collecting device as defined in claim 1, wherein said collecting bowl has an oval-shaped cross-section and tapers to a reduced cross-section downward in form of a truncated cone.

3. A water collecting device as defined in claim 1, wherein said actuating lever is spaced from said collecting bowl to enable an animal to reach the bottom of the bowl without tripping said actuating lever.

4. A water collecting device as defined in claim 1, wherein said holding clamp and said bottom portion are comprised of synthetic material.

5. A water collecting device as defined in claim 1, wherein said holding clamp and said actuating lever are comprised of corrosion resistant metal.

6. A water collecting device as defined in claim 1, wherein said actuating lever is comprised of hard bar high-grade steel.

7. The water collecting device as defined in claim 1, wherein said holding clamp has a T-shaped groove open at least to the outside for fastening said bottom portion to said holding clamp.

8. A water collecting device as defined in claim 11, wherein said holding clamp has a U-shaped cross-section with a center portion, said center portion having a passage communicating with the center of said watering valve.

9. A water collecting device as defined in claim 8, wherein said holding clamp has a substantially reduced clearance width between the free ends of the outer leg portions of said U-shaped cross-section.

10. The water collecting device as defined in claim 1, wherein said holding clamp has a recess open at least to the outside for fastening said bottom portion to said holding clamp.

11. A water collecting device as defined in claim 10, wherein said recess extends between two end surfaces of said clamp, said clamp having a U-shape with a center portion having a passage communicating with the center of said watering valve, said recess being in proximity of said passage.

12. A water collecting device as defined in claim 11, wherein said recess is open to the outside and directed downward, said recess being closed at two face sides of said holding clamp and forming said passage, said recess having a length substantially larger than its width.

13. A water collecting device as defined in claim 12, wherein said bottom portion has a fastening head with a valve insertion opening.

14. A water collecting device as defined in claim 13, including an end plate below said holding clamp for seating said fastening head, said end plate being on top of said bottom portion.

15. A water collecting device as defined in claim 13, wherein said fastening head has at least one neck portion with at least one holding rim connected to said neck portion and projecting sideways, the outer cross-section of said neck portion having dimensions in a first direction substantially smaller than the width of the opening of said recess, the outer cross-section of said holding rim having a dimension in said first direction substantially smaller than the width and length of said recess and being substantially larger than the width of the opening of said recess, said outer cross-section of said holding rim having dimensions in a second direction perpendicular to said first direction substantially smaller than the width of the opening of said recess, said holding rim having a height substantially smaller than the depth of a wider portion of said recess for permitting insertion of said bottom portion into said recess from below and rotation in a horizontal plane by 90°.

16. A water collecting device as defined in claim 15, wherein said holding rim has rounded corner areas and extends at least partially around said valve insertion opening.

17. A water collecting device as defined in claim 15, wherein said holding rim comprises two facing rim sections on opposites sides of said valve insertion opening.

18. A water collecting device as defined in claim 15, wherein said holding rim has a substantially wider portion transverse to said collecting bowl.

19. A water collecting device as defined in claim 1, wherein said actuating lever is a substantially spoon-shaped water reservoir with a pivot support and a rear lever extension, said extension moving upward upon depression of said actuating lever to open said watering valve, water running via said spoon-shaped actuating lever into said collecting bowl upon opening of said watering valve.

20. A water collecting device as defined in claim 19, wherein said spoon-shaped actuating lever has a depression tilted forwarded away from said lever extension.

* * * * *